US010661859B2

(12) United States Patent
Shimizu

(10) Patent No.: US 10,661,859 B2
(45) Date of Patent: May 26, 2020

(54) LEVER APPARATUS

(71) Applicant: HONDA MOTOR CO., LTD., Minato-ku, Tokyo (JP)

(72) Inventor: Masahiro Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/217,212

(22) Filed: Dec. 12, 2018

(65) Prior Publication Data

US 2019/0202527 A1    Jul. 4, 2019

(30) Foreign Application Priority Data

Dec. 28, 2017  (JP) .................................. 2017-252914

(51) Int. Cl.
| | |
|---|---|
| B62M 25/04 | (2006.01) |
| F16D 23/12 | (2006.01) |
| B62K 23/06 | (2006.01) |
| F16H 61/00 | (2006.01) |
| F16H 35/00 | (2006.01) |

(52) U.S. Cl.
CPC ............ B62M 25/04 (2013.01); B62K 23/06 (2013.01); F16D 23/12 (2013.01); F16H 61/0028 (2013.01); F16H 2035/001 (2013.01)

(58) Field of Classification Search
CPC ........ B62M 25/04; B62K 23/06; F16D 23/12; F16H 61/0028; F16H 2035/001
See application file for complete search history.

(56) References Cited

U.S. PATENT DOCUMENTS

| | | | | |
|---|---|---|---|---|
| 6,550,351 B1 * | 4/2003 | O'Reilly | ............... | F16H 59/105 74/335 |
| 7,802,489 B2 * | 9/2010 | Tsumiyama | ........... | B62K 23/06 74/502.2 |

(Continued)

FOREIGN PATENT DOCUMENTS

| | | |
|---|---|---|
| CN | 2254866 | 5/1997 |
| CN | 101398045 | 4/2009 |

(Continued)

OTHER PUBLICATIONS

Extended European Search Report for European Patent Application No. 18212187.1 dated Jun. 13, 2019.

(Continued)

*Primary Examiner* — Vicky A Johnson
(74) *Attorney, Agent, or Firm* — Amin, Turocy & Watson, LLP

(57) ABSTRACT

A lever apparatus includes a lever operated by a user, a biasing member that is a source of an operation reaction force of the lever, and a linkage mechanism configured to link the lever and the biasing member. The linkage mechanism includes a lever-side rotating body pivoted according to pivoting of the lever, and a biasing member-side rotating body engaged with lever-side rotating body and installed closer to the biasing member than the lever-side rotating body. The linkage mechanism varies a ratio of a variation of a rotation angle of the biasing member-side rotating body to a variation of a rotation angle of the lever-side rotating body according to an operation amount of the lever.

12 Claims, 7 Drawing Sheets

(56) References Cited

U.S. PATENT DOCUMENTS

| | | | | |
|---|---|---|---|---|
| 2006/0112930 A1* | 6/2006 | Matsuda | ............... | F02D 9/1035 |
| | | | | 123/399 |
| 2009/0107797 A1* | 4/2009 | Oishi | ...................... | F16D 23/12 |
| | | | | 192/93 A |
| 2015/0337957 A1* | 11/2015 | Cyren | ..................... | F16H 61/32 |
| | | | | 74/473.12 |
| 2019/0202527 A1* | 7/2019 | Shimizu | ................. | B62K 23/06 |
| 2019/0301541 A1* | 10/2019 | Minami | .................. | F16D 23/12 |
| 2019/0316639 A1* | 10/2019 | Minami | .................. | F16D 28/00 |

FOREIGN PATENT DOCUMENTS

| | | | | |
|---|---|---|---|---|
| CN | 102730122 | 10/2012 | | |
| DE | 10316435 | 11/2003 | | |
| EP | 1580460 | 9/2005 | | |
| JP | 5639142 | 12/2014 | | |
| WO | 00/06446 | 2/2000 | | |
| WO | WO-2019146288 A1 * | 8/2019 | ................ | B62J 6/00 |

OTHER PUBLICATIONS

Chinese Office Action and Search Report for Chinese Patent Application No. 201811587736.8 dated Jan. 19, 2020.

\* cited by examiner

LEVER APPARATUS

CROSS-REFERENCE TO RELATED APPLICATION

Priority is claimed on Japanese Patent Application No. 2017-252914, filed Dec. 28, 2017, the content of which is incorporated herein by reference.

BACKGROUND OF THE INVENTION

Field of the Invention

The present invention relates to a lever apparatus.

Description of Related Art

In the related art, a clutch-by-wire system configured to electrically connect a clutch lever and a clutch apparatus is known. For example, the clutch-by-wire system includes an actuator configured to drive the clutch apparatus, an operation amount detection means configured to detect an operation amount of the clutch lever, and an electronic control unit configured to control an action of an actuator on the basis of a detection value of the operation amount detection means.

In a clutch-by-wire system, in order to produce an operation load of a conventional clutch lever mechanically connected to a clutch apparatus by a hydraulic pressure, a cable, or the like, a mechanism configured to apply an operation reaction force to a clutch lever is provided (for example, see Japanese Patent No. 5639142). Japanese Patent No. 5639142 discloses a gear box including a clutch lever and a plurality of coils configured to stepwisely vary a rate of increase of an operation reaction force of the clutch lever as biasing forces thereof are applied in stages.

SUMMARY OF THE INVENTION

However, in the gear box disclosed in Japanese Patent No. 5639142, since a rate of increase of an operation reaction force stepwisely varies depending on a predetermined gripping amount, an operator may feel uncomfortable.

An aspect of the present invention is directed to providing a lever apparatus that enables a lever operation without feeling uncomfortable.

(1) A lever apparatus according to an aspect of the present invention includes a lever operated by a user; a biasing member that is a source of an operation reaction force of the lever; and a linkage mechanism configured to link the lever and the biasing member, wherein the linkage mechanism includes: a lever-side rotating body that is configured to pivot according to a pivot of the lever; and a biasing member-side rotating body that is engaged with the lever-side rotating body and that is installed on the biasing member side of the lever-side rotating body, and the linkage mechanism varies a ratio of a variation of a rotation angle of the biasing member-side rotating body with respect to a variation of a rotation angle of the lever-side rotating body according to an operation amount of the lever.

(2) In the aspect of above mentioned (1), the lever-side rotating body may be pivoted around a first axis, the biasing member-side rotating body may be pivoted around a second axis which is different from the first axis, and a ratio of a second distance with respect to a first distance may be varied according to the operation amount of the lever, the first distance being a distance from the first axis to an engagement position which is a position in which the lever-side rotating body and the biasing member-side rotating body engages with each other, the second distance being a distance from the second axis to the engagement position.

(3) In the aspect of above mentioned (1) or (2), the ratio of the variation of a rotation angle of the biasing member-side rotating body with respect to the variation of the rotation angle of the lever-side rotating body may be reduced as the operation amount of the lever is increased.

(4) In the aspect of above mentioned (3), a rate change of the ratio of the variation of the rotation angle of the biasing member-side rotating body with respect to the variation of the rotation angle of the lever-side rotating body in an intermediate region of an operation range of the lever may be smaller than a rate change in regions on both sides of the intermediate region which sandwich the intermediate region.

(5) In the aspect of any one of above mentioned (1) to (4), the biasing member-side rotating body may be disposed at a side opposite to a side at which the lever extends toward a pivot center of the lever.

(6) In the aspect of any one of above mentioned (1) to (5), the biasing member may be a torsion coil spring wound around a rotation center of the biasing member-side rotating body.

(7) In the aspect of any one of above mentioned (1) to (6), the lever may be independently pivotably installed with respect to the lever-side rotating body by a predetermined angle from a position before operation of the lever, and an auxiliary biasing member configured to bias the lever toward the position before operation of the lever with respect to the lever-side rotating body may be further provided.

(8) In the aspect of any one of above mentioned (1) to (7), the lever-side rotating body may include a lever-side gear section, and the biasing member-side rotating body may include a biasing member-side gear section that meshes with the lever-side gear section.

(9) In the aspect of any one of above mentioned (1) to (8), the lever apparatus may further include a rotation sensor configured to detect a rotation angle of the lever, wherein the rotation sensor is disposed coaxially with a pivot center of the lever.

(10) In the aspect of above mentioned (9), the rotation sensor may be disposed below the lever.

According to the lever apparatus of the aspect of above mentioned (1), since a biasing force of the biasing member is transmitted to the lever via the linkage mechanism, an operation reaction force can be applied to the lever. Further, since a degree of change of a ratio of a variation of a rotation angle of the biasing member-side rotating body with respect to a variation of a rotation angle of the lever-side rotating body can be appropriately set, a proportion of a torque transmitted to the lever from the biasing member via the biasing member-side rotating body and the lever-side rotating body can be arbitrarily set. For this reason, the operation reaction force of the lever can be non-linearly and continuously varied with respect to the operation amount of the lever. Accordingly, a lever operation without feeling uncomfortable becomes possible.

According to the aspect of above mentioned (2), as a ratio of a second distance, which is a distance from the second axis to the meshing position which is a position in which the lever-side rotating body and the biasing member-side rotating body engages with each other, with respect to a first distance, which is a distance from the first axis to the meshing position which is a position in which the lever-side rotating body and the biasing member-side rotating body engages with each other, is varied, since a ratio of a variation of a rotation angle of the biasing member-side rotating body with respect to a variation of a rotation angle of the lever-side rotating body can be varied, the lever apparatus showing the above-mentioned effects can be configured.

According to the aspect of above mentioned (3), the percentage of the torque of the biasing member transmitted to the lever from the biasing member via the biasing member-side rotating body and the lever-side rotating body is reduced as an operation amount of the lever is increased. Accordingly, a rate of increase of the operation reaction force of the lever is reduced as the operation amount of the lever is increased. Accordingly, the operation reaction force of the lever is increased so as to gradually approach a predetermined value as the operation amount of the lever is increased. Therefore, like the operation feeling of a clutch lever used in a conventional manual transmission, it is possible to approximate characteristics in which the operation reaction force of the lever becomes substantially constant in the final stage of operation.

According to the aspect of above mentioned (4), a rate of increase of an operation reaction force of the lever is greatly reduced in an intermediate region of the operation range of the lever than in regions on both sides of the intermediate region which sandwich the intermediate regions. For this reason, a rate of increase of the operation reaction force with respect to the operation amount of the lever is clearly reduced in a region which is on an operation termination end side of the intermediate region with respect to a region which is on an operation starting end side of the intermediate region. Accordingly, a property of the operation reaction force of the lever can approach closer to the operation feeling of the clutch lever used in the manual transmission of the related art.

According to the aspect of above mentioned (5), an increase in size of the lever apparatus in a direction in which the lever extends can be minimized.

According to the aspect of above mentioned (6), since the biasing member is disposed coaxially with the biasing member-side rotating body, the lever apparatus can be reduced in size in comparison with the configuration in which the biasing member is installed next to the biasing member-side rotating body. In addition, since the biasing member is disposed coaxially with the biasing member-side rotating body, the biasing member-side rotating body can be easily biased around the second axis. Accordingly, complication of a structure of the lever apparatus can be prevented.

According to the aspect of above mentioned (7), the lever can be pivoted while contracting the auxiliary biasing member to a predetermined angle from the position before operation of the lever without pivoting the lever-side rotating body. Accordingly, a lever play can be formed within a pivot range to a predetermined angle from start of gripping of the lever. Accordingly, the same operation feeling as the operation feeling of the clutch lever used in the manual transmission of the related art can be reproduced.

According to the aspect of above mentioned (8), the linkage mechanism configured to link the lever and the biasing member can be formed by engaging the biasing member-side rotating body with the lever-side rotating body.

According to the aspect of above mentioned (9), the rotation sensor can directly detect a rotation angle of the lever. Accordingly, for example, in a configuration in which the lever-side rotating body and the biasing member-side rotating body meshing with each other, the rotation angle of the lever can be accurately detected without receiving an influence of a backlash at the meshing position. In addition, even when a lever play is formed within a pivot range of the lever, a rotation angle of the lever can be accurately detected by directing detecting the rotation angle of the lever.

According to the aspect of above mentioned (10), the rotation sensor being disposed to protrude upward from the lever and becoming an obstacle with respect to an operator can be avoided.

DETAILED DESCRIPTION OF THE INVENTION

Figure 1:
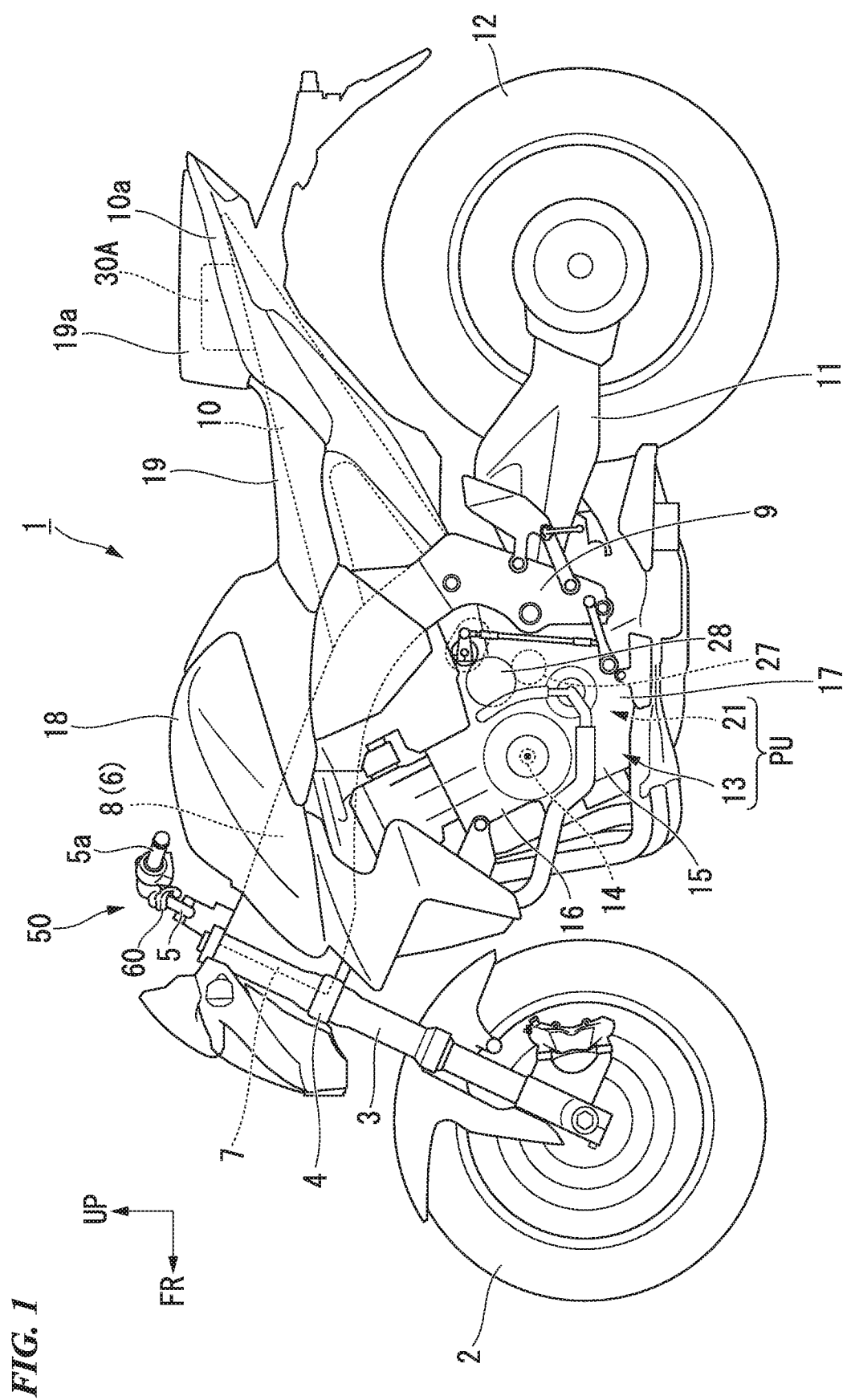
FIG. 1 is a left side view of a motorcycle of a first embodiment.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

(First embodiment)

FIG. 1 is a left side view of a motorcycle of a first embodiment.

As shown in FIG. 1, the embodiment is applied to a motorcycle 1 that is a saddle riding vehicle. A front wheel 2 of the motorcycle 1 is supported by lower end portions of a pair of left and right front forks 3.

Upper sections of the left and right front forks 3 are supported by a head pipe 7 of a front end portion of a vehicle body frame 6 via a steering stem 4. A steering handle bar 5 is attached to a top bridge of the steering stem 4. Grip sections 5a gripped by a driver are installed on left and right outer portions of the handle bar 5. Further, in the embodiment, the grip sections 5a extend in a vehicle width direction (a leftward and rightward direction). However, the grip sections 5a may extend to be inclined with respect to the vehicle width direction.

The vehicle body frame 6 includes the head pipe 7, main tubes 8 extending downward and rearward from the head pipe 7 toward a center in the vehicle width direction, left and right pivot frames 9 that are connected to lower sides of rear end portions of the main tubes 8, and a seat frame 10 that is connected to rear sides of the main tubes 8 and the left and right pivot frames 9. A front end portion of a swing arm 11 is swingably supported by the left and right pivot frames 9.

A rear wheel 12 of the motorcycle 1 is supported by a rear end portion of the swing arm 11.

A fuel tank 18 is supported above the left and right main tubes 8. A front seat 19 and a rear seat cover 19a that are disposed in a forward and rearward direction are supported behind the fuel tank 18 and above the seat frame 10. The surroundings of the seat frame 10 are covered with a rear cowl 10a. A power unit PU that is a prime mover of the motorcycle 1 is suspended at below the left and right main tubes 8. The power unit PU is linked to the rear wheel 12 via, for example, a chain type transmission mechanism.

The power unit PU integrally has an engine 13 disposed at the front thereof and a transmission 21 disposed at the rear thereof. The engine 13 is, for example, a multi-cylinder engine in which a rotation axis of a crankshaft 14 is in the vehicle width direction. In the engine 13, a cylinder 16 stands up at a front upper side of a crank case 15. A rear section of the crank case 15 is a transmission case 17 that accommodates the transmission 21. The transmission 21 is a stepped transmission.

Figure 2:
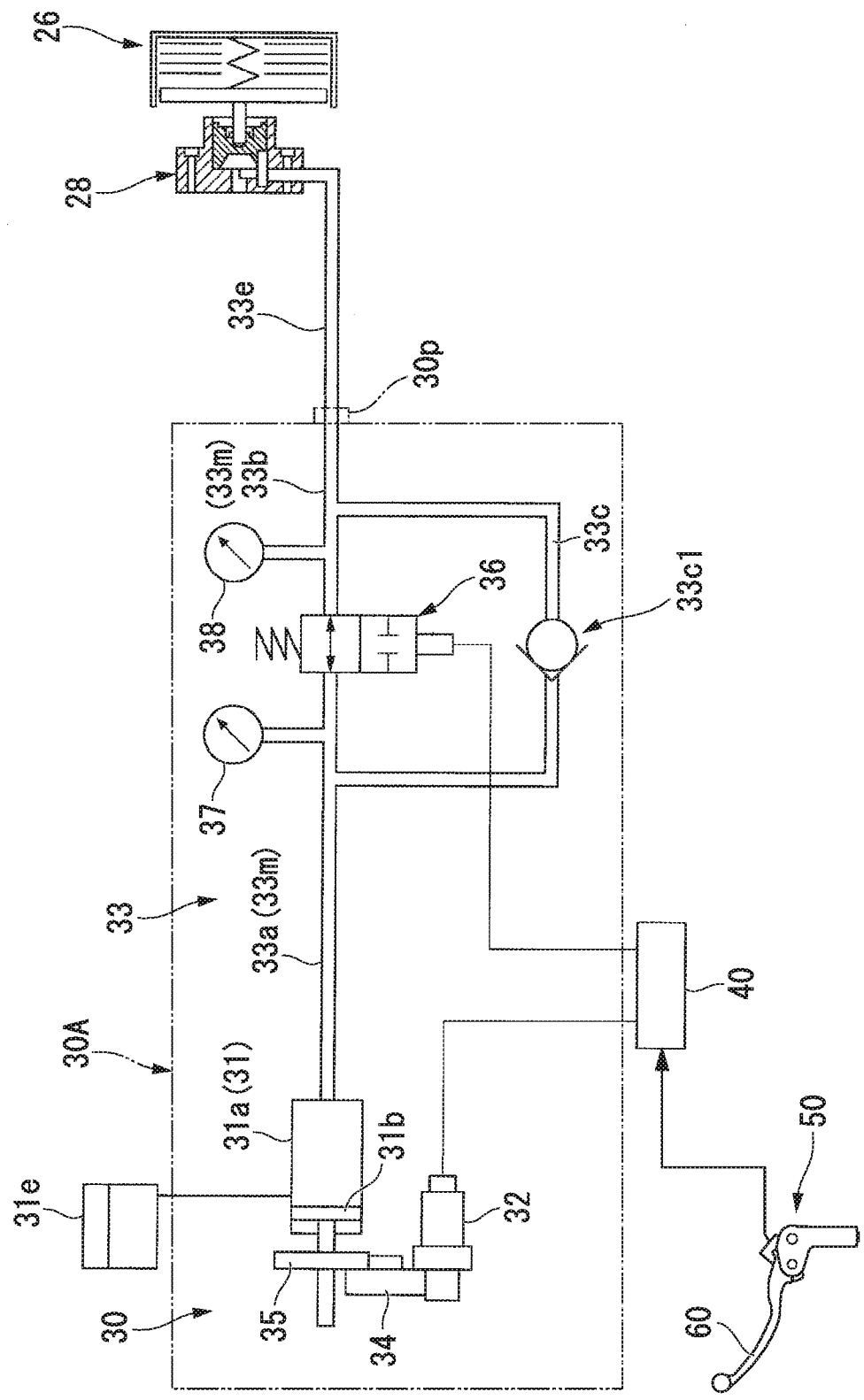
FIG. 2 is a view for schematically explaining a clutch operating system including a clutch actuator.

FIG. 2 is a view for schematically explaining a clutch operating system including a clutch actuator.

As shown in FIGS. 1 and 2, a clutch apparatus 26 operated by a clutch actuator 30 is disposed in the transmission 21. The clutch apparatus 26 may be, for example, a wet multiple disk clutch, or a so-called normally open clutch. That is, the clutch apparatus 26 is in a connection state in which power transmission becomes possible due to supply of a hydraulic pressure from the clutch actuator 30, and is in a disconnection state in which power transmission becomes impossible when there is no supply of a hydraulic pressure from the clutch actuator 30.

The rotating power of the crankshaft 14 is transmitted to the transmission 21 via the clutch apparatus 26. A drive sprocket 27 of the chain type transmission mechanism is attached to the transmission 21.

Here, a gear shift system of the motorcycle 1 includes the clutch actuator 30, an electronic control unit (ECU) 40, and a clutch lever apparatus 50 (a lever apparatus).

As shown in FIG. 2, the clutch actuator 30 can control a liquid pressure that disconnects and connects the clutch apparatus 26 when operated and controlled by the ECU 40. The clutch actuator 30 includes an electric motor 32 (hereinafter, simply referred to as the motor 32) that is a driving source, and a master cylinder 31 driven by the motor 32. The clutch actuator 30 constitutes an integrated clutch control unit 30A together with a hydraulic pressure circuit apparatus 33 installed between the master cylinder 31 and a hydraulic pressure supply and discharge port 30p.

The ECU 40 calculates a target value of a hydraulic pressure (a target hydraulic pressure) supplied to a slave cylinder 28 configured to disconnect and connect the clutch apparatus 26 on the basis of a detection value of a rotation sensor 100 (to be described below) and an arithmetic program that is previously installed. The ECU 40 controls the clutch control unit 30A such that a hydraulic pressure (a slave hydraulic pressure) on a side of the slave cylinder 28 detected by a downstream-side hydraulic pressure sensor 38 approaches a target hydraulic pressure.

The master cylinder 31 is possible to supply and discharge a working fluid in the cylinder main body 31a with respect to the slave cylinder 28 by causing a piston 31b in a cylinder main body 31a to stroke through driving of the motor 32. Reference numeral 35 in the drawings designates a conversion mechanism that is a ball-screw mechanism, reference numeral 34 designates a transmission mechanism that bridges between the motor 32 and the conversion mechanism 35, and reference numeral 31e designates a reservoir connected to the master cylinder 31.

The hydraulic pressure circuit apparatus 33 has a valve mechanism (a solenoid valve 36) configured to open or close an intermediate area of a main oil path 33m extending from the master cylinder 31 toward the clutch apparatus 26 (the slave cylinder 28). The main oil path 33m of the hydraulic pressure circuit apparatus 33 is divided into an upstream-side oil path 33a that is on the master cylinder 31 side of the solenoid valve 36, and a downstream-side oil path 33b that is on the slave cylinder 28 side of the solenoid valve 36. The hydraulic pressure circuit apparatus 33 further includes a bypass oil path 33c configured to bypass the solenoid valve 36 and allow the upstream-side oil path 33a and the downstream-side oil path 33b to communicate with each other.

The solenoid valve 36 is a so-called normal open valve. A one-way valve 33c1 configured to allow a working fluid to flow only in a direction from an upstream side toward a downstream side is installed in the bypass oil path 33c. An upstream-side hydraulic pressure sensor 37 configured to detect a hydraulic pressure of the upstream-side oil path 33a is installed upstream from the solenoid valve 36. The downstream-side hydraulic pressure sensor 38 configured to detect a hydraulic pressure of the downstream-side oil path 33b is installed downstream from the solenoid valve 36.

As shown in FIG. 1, the clutch control unit 30A is accommodated in, for example, the rear cowl 10a. The slave cylinder 28 is attached to a left side of a rear section of the crank case 15. The clutch control unit 30A and the slave cylinder 28 are connected to each other via a hydraulic pressure pipeline 33e (see FIG. 2).

As shown in FIG. 2, the slave cylinder 28 operates the clutch apparatus 26 such that it is brought into a connection state upon supply of a hydraulic pressure from the clutch actuator 30. The slave cylinder 28 returns the clutch apparatus 26 to a disconnection state when there is no supply of hydraulic pressure.

While the supply of the hydraulic pressure needs to be continuous to keep the clutch apparatus 26 in a connection state, electric power is consumed accordingly. Here, the solenoid valve 36 is installed in the hydraulic pressure circuit apparatus 33 of the clutch control unit 30A, and the solenoid valve 36 is closed after the hydraulic pressure is supplied to the clutch apparatus 26 side. Accordingly, energy consumption is minimized using a configuration for maintaining a hydraulic pressure supplied to the clutch apparatus 26 side and supplementing a hydraulic pressure just for an extent of pressure loss (recharge just for an extent of leakage).

Figure 3:
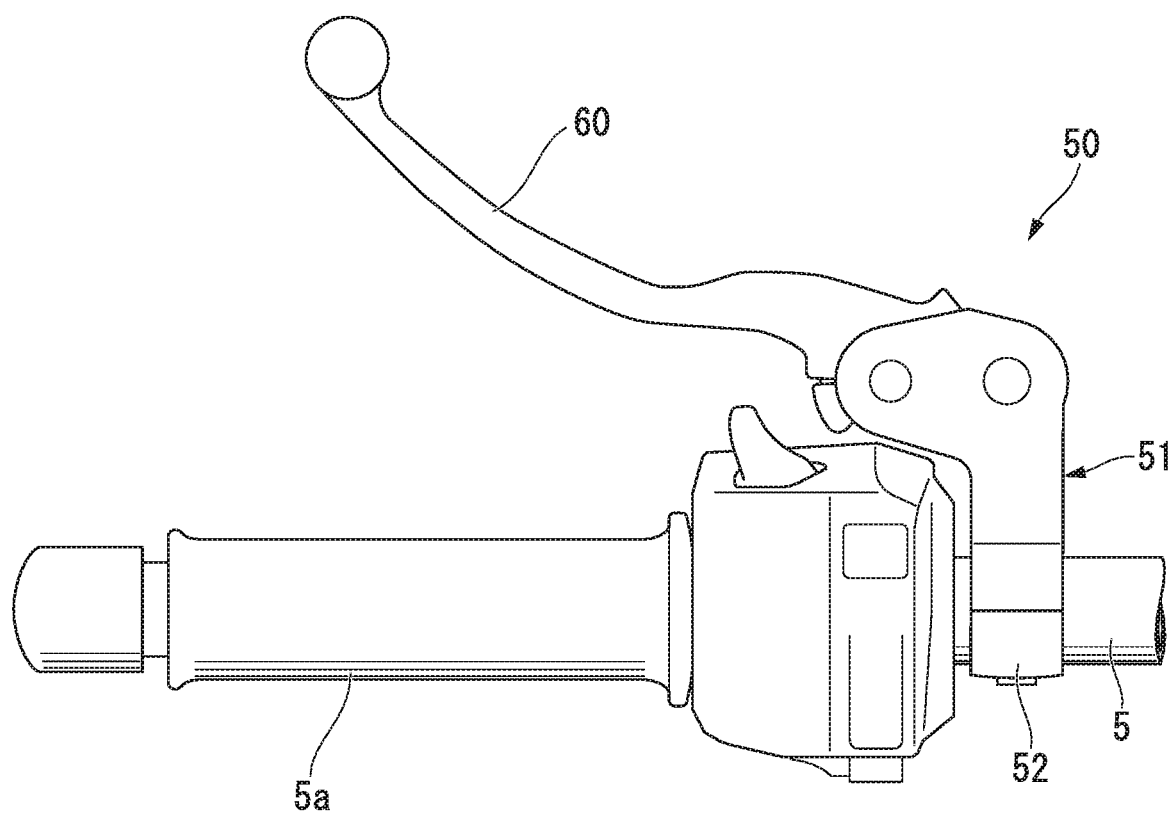
FIG. 3 is a plan view of a vicinity of a clutch lever apparatus of the first embodiment.

FIG. 3 is a plan view of a vicinity of the clutch lever apparatus of the first embodiment.

As shown in FIG. 3, the clutch lever apparatus 50 is attached to the handle bar 5 to be arranged next to the grip section 5a which is disposed on a left side.

Figure 4:
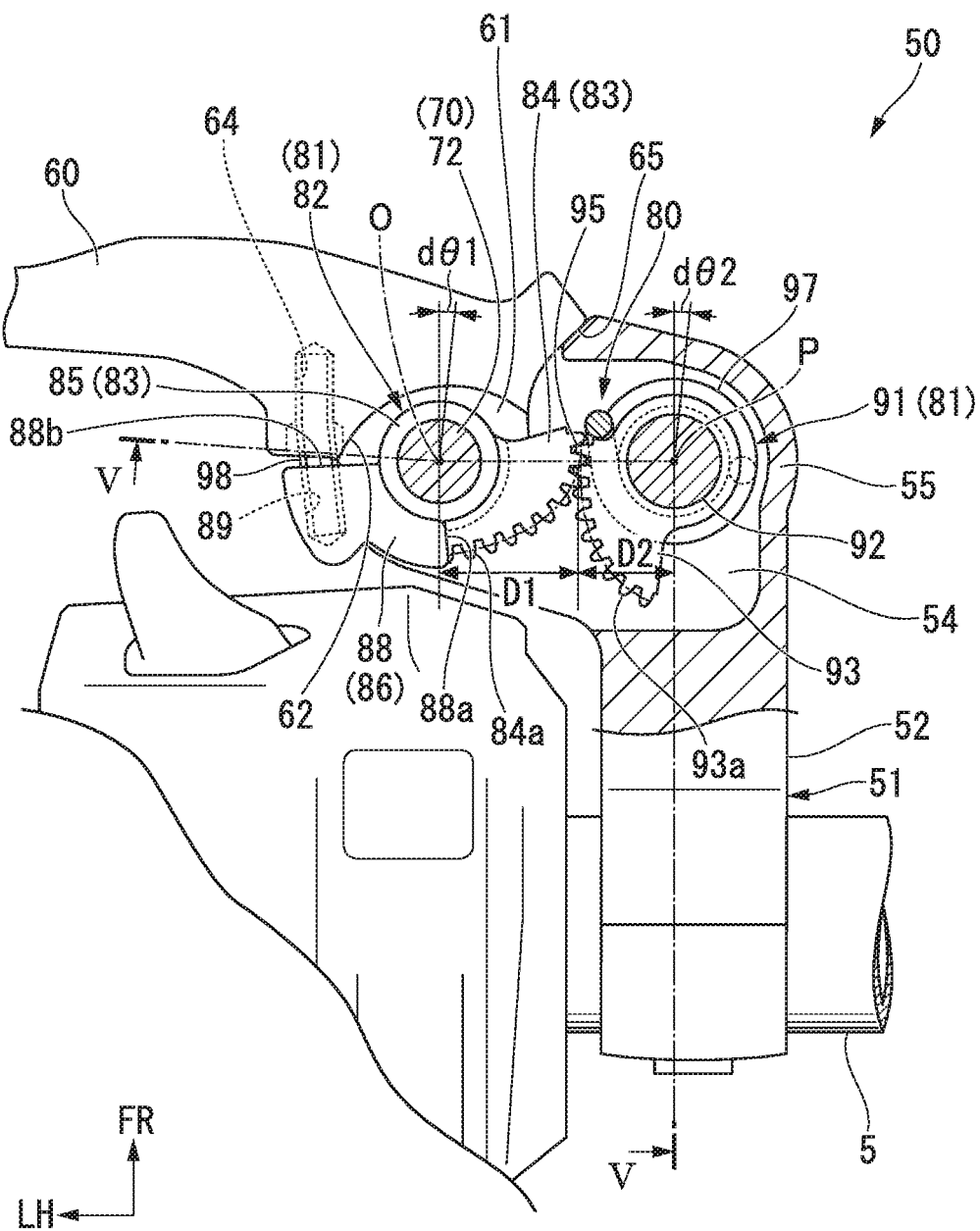
FIG. 4 is a partial cross-sectional view of a clutch lever apparatus of the first embodiment when seen from above.
Figure 5:
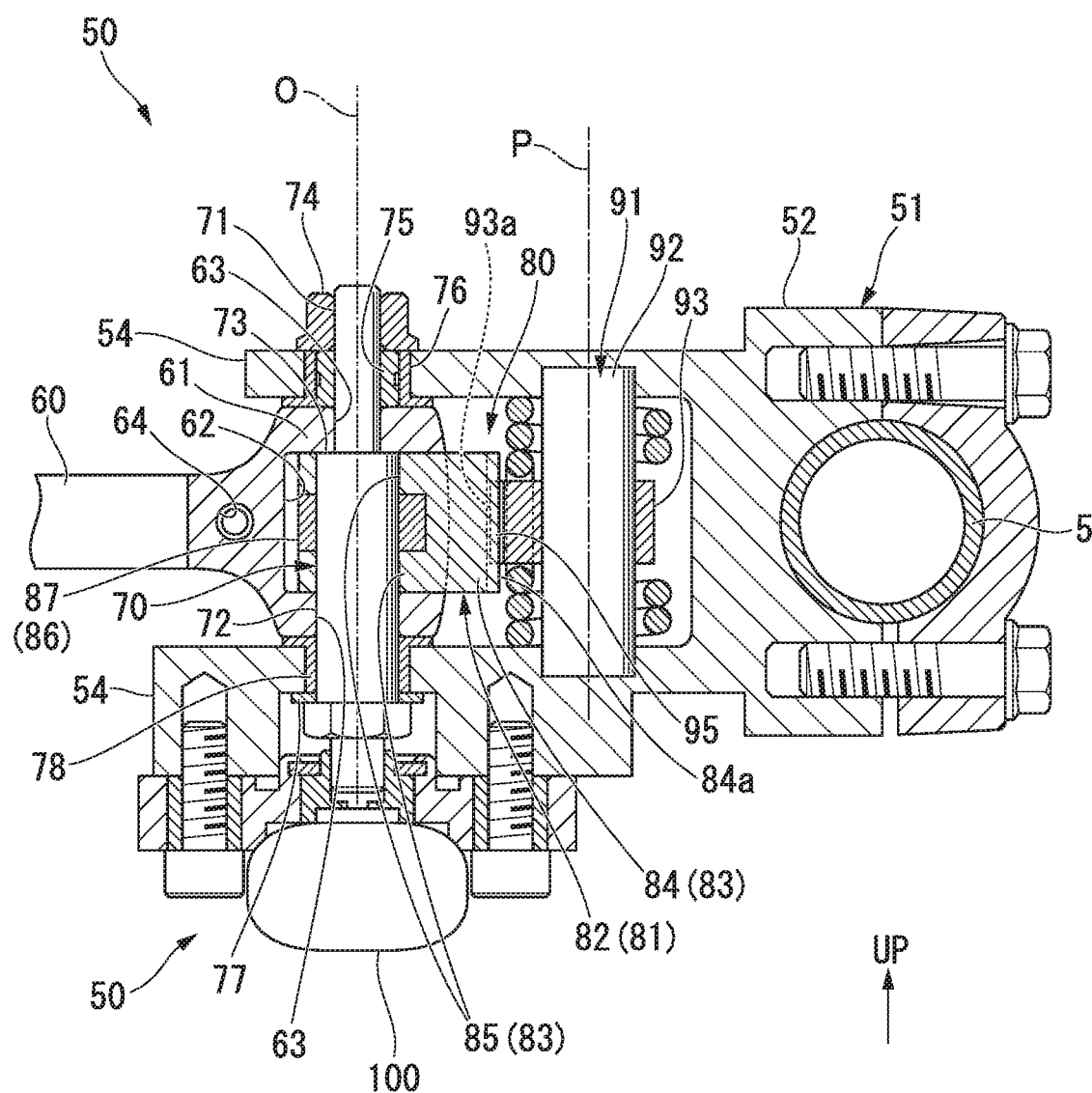
FIG. 5 is a cross-sectional view of a portion corresponding to line V-V in FIG. 4.

FIG. 4 is a partial cross-sectional view of the clutch lever apparatus of the first embodiment when seen from above. FIG. 5 is a cross-sectional view of a portion corresponding to line V-V in FIG. 4.

As shown in FIGS. 4 and 5, the clutch lever apparatus 50 includes a lever holder 51, a clutch lever 60, a reaction force application part 80 and a rotation sensor 100.

The lever holder 51 is attached to a side (a right side) of the handle bar 5 that is inward than the grip section 5a, which is disposed on a left side, in the vehicle width direction (see FIG. 3). The lever holder 51 includes a fixed section 52 fixed to the handle bar 5, a pair of holding plate sections 54 extending from the fixed section 52 parallel to each other while having an interval therebetween in the upward and downward direction, and a connection wall 55 that connects the pair of holding plate sections 54. Further, in the embodiment, the holding plate sections 54 extend forward from the fixed section 52. However, for example, the holding plate sections 54 may extend downward and forward from the fixed section 52. As shown in FIG. 4, the pair of holding plate sections 54 extends forward from the fixed section 52 and toward an outer side in the vehicle width direction. The connection wall 55 extends from an end portion of an inner side of the fixed section 52 in the vehicle width direction so as to connect edges of the pair of holding plate sections 54. Specifically, the connection wall 55 extends from the fixed section 52 along edges of the holding plate sections 54 that faces the inner sides in the vehicle width direction, and then, extends along edges of the holding plate sections 54 that faces the front side. The reaction force application part 80 are disposed in a space surrounded by the pair of holding plate sections 54 and the connection wall 55.

The clutch lever 60 is a clutch operator operated by an operator (a user). The clutch lever 60 is disposed in front of the grip section 5a on a left side (see FIG. 3). The clutch lever 60 is pivotably supported by the lever holder 51. Specifically, a base section 61 of the clutch lever 60 is disposed between the pair of holding plate sections 54 of the lever holder 51 and is supported by the pair of holding plate sections 54 via a support shaft 70 (see FIG. 5). The clutch lever 60 is pivoted about a first axis O. In the embodiment, the first axis O extends in the upward and downward direction. The clutch lever 60 extends outward from the base section 61 in the vehicle width direction. Hereinafter, in the following description related to a form of the clutch lever apparatus unless the context clearly indicates otherwise, a state in which the clutch lever 60 is not operated (a state shown in FIG. 4) will be described. In addition, in the following description, among pivot positions of the clutch lever 60, a position in a state in which the clutch lever 60 is not operated is referred to as a position before operation of the clutch lever 60. A position before operation of the clutch lever 60 is a position in which the clutch lever 60 is in an initial state. In addition, a pivoting direction of components of the clutch lever apparatus 50 in the following direction is a direction when seen from above.

As shown in FIG. 5, a groove section 62, a support shaft insertion hole 63 and an auxiliary biasing member accommodating section 64 are formed in the base section 61 of the clutch lever 60. The groove section 62 extends to be perpendicular to the first axis O. The groove section 62 is formed to face a space surrounded by the pair of holding plate sections 54 and the connection wall 55 of the lever holder 51. The support shaft insertion hole 63 vertically passes through both of upper and lower sides of the groove section 62. The support shaft insertion hole 63 is formed in a circular shape. As shown in FIG. 4, the auxiliary biasing member accommodating section 64 is disposed on an outer side of the base section 61 with respect to the first axis O in the vehicle width direction, and formed on a surface facing in a counterclockwise direction about the first axis O.

The auxiliary biasing member accommodating section 64 is a concave section recessed in a clockwise direction about the first axis O.

In addition, the clutch lever 60 includes an abutting section 65. The abutting section 65 is an area abutting a tip of the connection wall 55 of the lever holder 51 in the clockwise direction about the first axis O. The clutch lever 60 restricts pivoting thereof in the clockwise direction about the first axis O by causing the abutting section 65 to abut a tip of the connection wall 55 of the lever holder 51. That is, the abutting section 65 and the connection wall 55 of the lever holder 51 define a position of an end portion of the clutch lever 60 among a pivot range of the clutch lever 60 in the clockwise direction about the first axis O. Accordingly, the clutch lever 60 is pivoted with respect to the position before operation of the clutch lever 60 within a predetermined range in the counterclockwise direction about the first axis O.

As shown in FIG. 5, the support shaft 70 is a bolt having a screw shaft 71 formed on a tip thereof. The support shaft 70 passes through the lever holder 51 and the clutch lever 60 from below.

Specifically, the support shaft 70 passes through the pair of holding plate sections 54 of the lever holder 51. In addition, the support shaft 70 passes through the support shaft insertion hole 63 of the clutch lever 60. The support shaft 70 includes a large diameter section 72 formed between the screw shaft 71 and a bolt head section and having a diameter larger than that of the screw shaft 71. A step difference surface 73 between the screw shaft 71 and the large diameter section 72 extends so as to be perpendicular to the central axis (the first axis O) of the support shaft 70.

The support shaft 70 is attached to the lever holder 51 by screwing a nut 74 onto the screw shaft 71 protruding upward from the lever holder 51. The step difference surface 73 of the support shaft 70 abuts a wall surface of the groove section 62 of the clutch lever 60 on an upper side as a seat surface. The nut 74 is fastened to the base section 61 of the clutch lever 60 via a spacer 75 externally fitted onto the support shaft 70.

Accordingly, a circumferential edge section of the support shaft insertion hole 63 of an upper side of the base section 61 of the clutch lever 60 is fixed to the support shaft 70 by a fastening force of the nut 74 in a state in which the circumferential edge section is sandwiched between the step difference surface 73 of the support shaft 70 and the spacer 75. The support shaft 70 is displaced (pivoted) integrally with the clutch lever 60. The upper section (the screw shaft 71) of the support shaft 70 is supported swingably with respect to the holding plate sections 54, which is disposed at above the lever holder 51, via a first bush 76 which is outserted onto the spacer 75. A lower section (the large diameter section 72) of the support shaft 70 is supported swingably with respect to the holding plate sections 54, which is placed under the lever holder 51, via a washer 77 and a second bush 78.

As shown in FIG. 4, the reaction force application part 80 applies an operation reaction force to the clutch lever 60.

The reaction force application part 80 includes a biasing member 97 and an auxiliary biasing member 98 that are sources of an operation reaction force of the clutch lever 60, and a linkage mechanism 81 configured to link the clutch lever 60 and the biasing member 97. The linkage mechanism 81 forms a transmission route through which a biasing force of the biasing member 97 is transmitted to the clutch lever 60 while an operation torque of the clutch lever 60 is transmitted to the biasing member 97.

The linkage mechanism 81 includes a lever-side rotating body 82 and a biasing member-side rotating body 91.

The lever-side rotating body 82 transmits an operation torque of the clutch lever 60 to the biasing member-side rotating body 91. The lever-side rotating body 82 is supported relatively rotatably with respect to the support shaft 70. The lever-side rotating body 82 is pivoted about the first axis O. The lever-side rotating body 82 includes a first member 83 and a second member 86. The first member 83 and the second member 86 are pivoted integrally with each other.

As shown in FIG. 5, the first member 83 includes a lever-side gear section 84, and a pair of cylindrical sections 85 that are connected to the lever-side gear section 84. The pair of cylindrical sections 85 are disposed in the groove section 62 of the base section 61 of the clutch lever 60. Each of the cylindrical sections 85 is formed in a cylindrical shape using the first axis O as a central axis. The pair of cylindrical sections 85 are disposed with an interval therebetween in the upward and downward direction. The pair of cylindrical sections 85 is outserted onto the large diameter section 72 of the support shaft 70.

As shown in FIG. 4, the lever-side gear section 84 protrudes from each of the cylindrical sections 85 toward an outer side of the cylindrical section 85 in a radial direction. The lever-side gear section 84 is installed to bridge the pair of cylindrical sections 85 (see FIG. 5). The lever-side gear section 84 is formed in a fan shape when seen in the upward and downward direction. Teeth 84a are formed on an outer circumferential surface of the lever-side gear section 84. A distance from the first axis O to the teeth 84a of the lever-side gear section 84 gradually reduces from an upstream side toward a downstream side in the clockwise direction about the first axis O.

As shown in FIG. 5, the second member 86 includes a shaft cylinder section 87, and a protrusion 88 (see FIG. 4) protruding from the shaft cylinder section 87. The shaft cylinder section 87 is formed in substantially the same shape as the cylindrical sections 85 of the first member 83 when seen in the upward and downward direction, and disposed between the pair of cylindrical sections 85 of the first member 83. The shaft cylinder section 87 is outserted onto the large diameter section 72 of the support shaft 70.

As shown in FIG. 4, the protrusion 88 protrudes from the shaft cylinder section 87 (see FIG. 5) toward an outer side of the shaft cylinder section 87 in the radial direction. The protrusion 88 is formed in a fan shape when seen in the upward and downward direction. The protrusion 88 includes a first end portion 88a in the counterclockwise direction about the first axis O, and a second end portion 88b in the clockwise direction about the first axis O. The first end portion 88a of the protrusion 88 abuts an end portion of the lever-side gear section 84 of the first member 83 in the clockwise direction about the first axis O. The second end portion 88b of the protrusion 88 is slightly separated from the clutch lever 60 in the counterclockwise direction about the first axis O. For example, a spacing angle between the protrusion 88 and the clutch lever 60 is about 4° about the first axis O. A concave section 89 is formed in the second end portion 88b of the protrusion 88. The concave section 89 opens in the clockwise direction about the first axis O. The concave section 89 opens to face the auxiliary biasing member accommodating section 64 of the clutch lever 60.

The biasing member-side rotating body 91 is installed on the biasing member 97 side of the lever-side rotating body 82 in the transmission route. The biasing member-side rotating body 91 transmits a biasing force of the biasing member 97 to the lever-side rotating body 82. The biasing member-side rotating body 91 is disposed between the pair of holding plate sections 54 of the lever holder 51. The biasing member-side rotating body 91 is disposed at a side (i.e., an inner side in the vehicle width direction) opposite to a side from which the clutch lever 60 extends with respect to the first axis O. The biasing member-side rotating body 91 is pivoted about a second axis P different from the first axis O and parallel to the first axis O. In the embodiment, a direction of the second axis P coincides with the upward and downward direction.

The biasing member-side rotating body 91 is engaged with the lever-side rotating body 82 and the outer circumferential surfaces. The biasing member-side rotating body 91 includes a shaft section 92, and a biasing member-side gear section 93 protruding from the shaft section 92. The shaft section 92 is formed in a columnar shape using the second axis P as a central axis. The shaft section 92 is rotatably held by the pair of holding plate sections 54 of the lever holder 51. The biasing member-side gear section 93 meshes with the lever-side gear section 84 of the lever-side rotating body 82 at a meshing position 95 (an engagement position). The biasing member-side gear section 93 protrudes from the shaft section 92 toward an outer side of the shaft section 92 in the radial direction. The biasing member-side gear section 93 is installed at a central section between the pair of holding plate sections 54 of the lever holder 51 in the upward and downward direction (see FIG. 5). The biasing member-side gear section 93 is formed in a fan shape when seen in the upward and downward direction. Teeth 93a are formed on the outer circumferential surface of the biasing member-side gear section 93. A distance from the second axis P to the teeth 93a of the biasing member-side gear section 93 gradually increases from an upstream side toward a downstream side in the counterclockwise direction about the second axis P. Teeth at the end portion in the clockwise direction about the second axis P among the teeth 93a of the biasing member-side gear section 93 meshes with the teeth at the end portion in the counterclockwise direction about the first axis O among the teeth 84a of the lever-side gear section 84.

Figure 6:
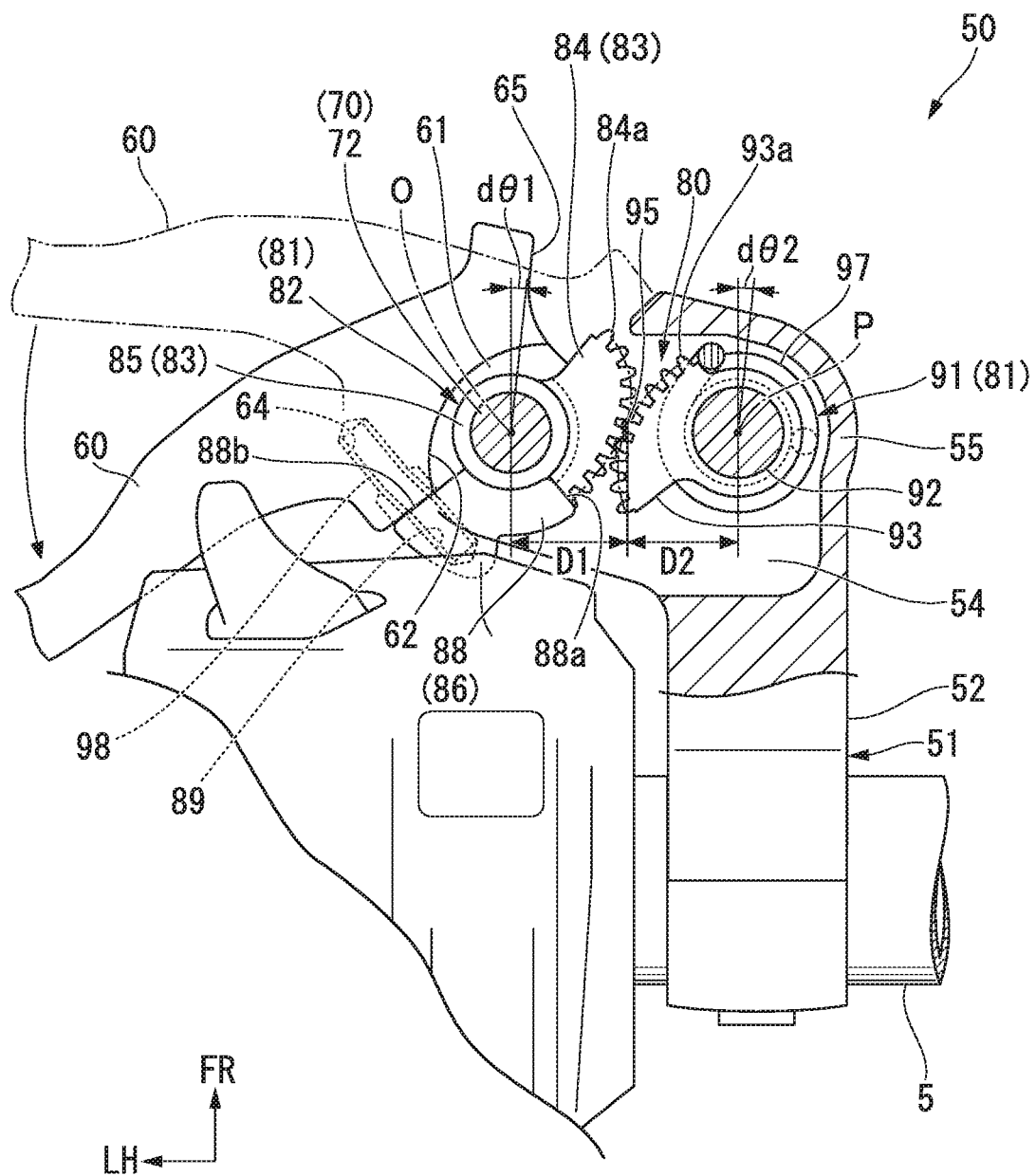
FIG. 6 is a partial cross-sectional view of the clutch lever apparatus of the first embodiment when seen from above.

FIG. 6 is a partial cross-sectional view when the clutch lever apparatus of the first embodiment is seen from above. Further, while a state in which the clutch lever 60 is not operated is shown in FIG. 4, a state in which the clutch lever 60 is operated is shown in FIG. 6.

As shown in FIGS. 4 and 6, a ratio D2/D1 of a second distance D2, which is a distance from the second axis P to the meshing position 95 which is a position in which the lever-side rotating body 82 and the biasing member-side rotating body 91 meshes with each other, with respect to a first distance D1, which is a distance from the first axis O to the meshing position 95 which is position in which the lever-side rotating body 82 and the biasing member-side rotating body 91 meshes with each other, is varied depending on pivoting of the lever-side rotating body 82 and the biasing member-side rotating body 91. Specifically, the ratio D2/D1 is continuously and gradually increased as the lever-side rotating body 82 is pivoted counterclockwise and the biasing member-side rotating body 91 is pivoted clockwise. The ratio D2/D1 is decreased when a ratio dθ2/dθ1 of a variation dθ2 of a rotation angle of the biasing member-side rotating body 91 with respect to a variation dθ1 of a rotation angle of the lever-side rotating body 82 is increased, and is increased when the ratio dθ2/dθ1 is decreased.

As shown in FIGS. 4 and 5, the biasing member 97 is a torsion coil spring wound around the second axis P. The biasing member 97 is outserted onto the shaft section 92 of the biasing member-side rotating body 91.

Both of end portions of the biasing member 97 are fixed to the pair of holding plate sections 54 of the lever holder 51. An intermediate portion of the biasing member 97 abuts an end portion of the biasing member-side gear section 93 of the biasing member-side rotating body 91 located in the clockwise direction about the second axis P. The biasing member 97 biases the biasing member-side rotating body 91 in the counterclockwise direction about the second axis P. A biasing force of the biasing member 97 is increased in proportion to a rotation angle from an initial position of the biasing member-side rotating body 91.

As shown in FIG. 4, the auxiliary biasing member 98 is disposed between the clutch lever 60 and the second member 86 of the lever-side rotating body 82. The auxiliary biasing member 98 is, for example, a compression coil spring. The auxiliary biasing member 98 biases the clutch lever 60 toward the position before operation of the clutch lever 60 with respect to the lever-side rotating body 82. The biasing force of the auxiliary biasing member 98 is set such that the lever-side rotating body 82 is contracted without pivoting when the clutch lever 60 is pivoted from the position before operation of the clutch lever 60.

As shown in FIG. 5, the rotation sensor 100 is disposed under the base section 61 of the clutch lever 60 and attached to the holding plate sections 54 which is under the lever holder 51. The rotation sensor 100 detects a rotation angle from a position before operation of the clutch lever 60. Hereinafter, a rotation angle from the position before operation of the clutch lever 60 is referred to as an operation amount of the clutch lever 60. The rotation sensor 100 converts an operation amount of the clutch lever 60 into an electrical signal and outputs the converted electrical signal. For example, the rotation sensor 100 is a so-called potentiometer. A pivot detector of the rotation sensor 100 is disposed coaxially with a rotation center (the first axis O) of the clutch lever 60, and integrally and pivotably connected to the support shaft 70. Since the support shaft 70 is pivoted integrally with the clutch lever 60, the operation amount of the clutch lever 60 is directly detected by the rotation sensor 100. The operation amount of the clutch lever 60 detected by the rotation sensor 100 is input to the ECU 40.

Next, an action of the clutch lever apparatus 50 of the embodiment will be described with reference to FIGS. 4 and 6.

When power transmission of the clutch apparatus 26 is disconnected, the clutch lever 60 is operated so as to pivot in the counterclockwise direction about the first axis O with respect to the position before operation of the clutch lever 60. The second end portion 88b of the protrusion 88 of the lever-side rotating body 82 is slightly separated from the clutch lever 60 in the counterclockwise direction about the first axis O. For this reason, the clutch lever 60 is independently pivoted with respect to the lever-side rotating body 82 by a predetermined angle while resisting a biasing force of the auxiliary biasing member 98 until the clutch lever 60 abuts the lever-side rotating body 82 from the position before operation of the clutch lever 60. Accordingly, a lever play in an operation starting stage of the clutch lever 60 is reproduced.

When the clutch lever 60 abuts the lever-side rotating body 82, an operation torque of the clutch lever 60 is transmitted to the lever-side rotating body 82, and the lever-side rotating body 82 is pivoted counterclockwise.

Since the lever-side rotating body 82 is meshing with the biasing member-side rotating body 91, an operation torque of the clutch lever 60 is transmitted to the biasing member-side rotating body 91. Accordingly, the biasing member-side rotating body 91 is pivoted clockwise. Here, a biasing force in the counterclockwise direction is applied to the biasing member-side rotating body 91 by the biasing member 97. For this reason, the biasing member 97 functions so as to pivot the clutch lever 60 clockwise via the biasing member-side rotating body 91 and the lever-side rotating body 82. Accordingly, an operation reaction force opposite to an operation direction is applied to the clutch lever 60.

Here, a ratio D2/D1 of the second distance D2, which is a distance from the second axis P to the meshing position 95 which is a position in which the lever-side rotating body 82 and the biasing member-side rotating body 91 meshes with each other, with respect to the first distance D1, which is a distance from the first axis O to the meshing position 95 which is a position in which the lever-side rotating body 82 and the biasing member-side rotating body 91 meshes with each other, is gradually increased as the lever-side rotating body 82 is pivoted counterclockwise and the biasing member-side rotating body 91 is pivoted clockwise. The lever-side rotating body 82 is pivoted counterclockwise as the clutch lever 60 is pivoted from the position before operation of the clutch lever 60. For this reason, the ratio D2/D1 is increased as the operation amount of the clutch lever 60 is increased. Accordingly, the linkage mechanism 81 varies a ratio dθ2/dθ1 of the variation dθ2 of the rotation angle of the biasing member-side rotating body 91 with respect to the variation dθ1 of the rotation angle of the lever-side rotating body 82 so that the ratio dθ2/dθ1 reduces as the operation amount of the clutch lever 60 is increased. When the ratio dθ2/dθ1 is reduced, a percentage of a torque transmitted from the biasing member 97 to the clutch lever 60 is reduced. Further, a percentage of a torque transmitted from the biasing member 97 to the clutch lever 60 is a percentage of a torque applied to the clutch lever 60 with respect to a torque applied to the biasing member-side rotating body 91 by the biasing member 97.

Figure 7:
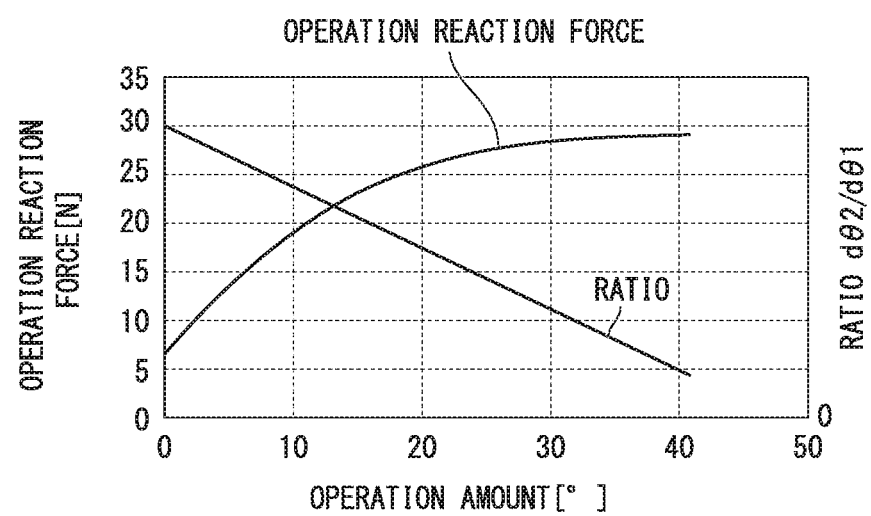
FIG. 7 is a graph schematically showing variation of an operation reaction force with respect to an operation amount of a clutch lever in the clutch lever apparatus of the first embodiment.

FIG. 7 is a graph schematically showing variation of an operation reaction force with respect to an operation amount of the clutch lever and a variation of the ratio dθ2/dθ1 in the clutch lever apparatus of the first embodiment.

In FIG. 7, a lateral axis represents an operation amount of the clutch lever 60, a vertical axis on a left side represents an operation reaction force applied to the clutch lever 60, and a vertical axis on a right side represents the ratio dθ2/dθ1. Further, in FIG. 7, a lever play in an operation starting stage of the clutch lever 60 is ignored.

As shown in FIG. 7, the ratio dθ2/dθ1 is continuous. Accordingly, an operation reaction force of the clutch lever 60 is continuously and smoothly increased. In addition, the ratio dθ2/dθ1 is continuously, smoothly and gradually reduced as an operation amount of the clutch lever 60 is increased. Accordingly, a rate of increase of the operation reaction force with respect to the operation amount of the clutch lever 60 is continuously and smoothly reduced as the operation amount of the clutch lever 60 is increased. As a result, the operation reaction force of the clutch lever 60 is non-linearly and continuously varied with respect to the operation amount of the clutch lever 60.

As described above, in the clutch lever apparatus 50 of the embodiment, the linkage mechanism 81 includes the lever-side rotating body 82 that is configured to pivot according to a pivot of the clutch lever 60, and the biasing member-side rotating body 91 that is engaged with the lever-side rotating body 82 and that is installed closer to the biasing member 97 than the lever-side rotating body 82. The linkage mechanism 81 varies a ratio dθ2/dθ1 of the variation dθ2 of the rotation angle of the biasing member-side rotating body 91 with respect to the variation dθ1 of the rotation angle of the lever-side rotating body 82 according to an operation amount of the clutch lever 60.

According to the configuration, since the biasing force of the biasing member 97 is transmitted to the clutch lever 60 via the linkage mechanism 81, the operation reaction force can be applied to the clutch lever 60. Further, since a degree of change of the ratio $d\theta2/d\theta1$ of the variation $d\theta2$ of the rotation angle of the biasing member-side rotating body 91 with respect to the variation $d\theta1$ of the rotation angle of the lever-side rotating body 82 can be appropriately set, a proportion of a torque transmitted from the biasing member 97 to the clutch lever 60 via the biasing member-side rotating body 91 and the lever-side rotating body 82 can be arbitrarily set. For this reason, the operation reaction force of the clutch lever 60 can be non-linearly and continuously varied with respect to the operation amount of the clutch lever 60. Accordingly, a lever operation without feeling uncomfortable becomes possible.

In addition, a ratio D2/D1 of the second distance D2, which is a distance from the second axis P to the meshing position 95 which is a position in which the lever-side rotating body 82 and the biasing member-side rotating body 91 meshes with each other, with respect to the first distance D1, which is a distance from the first axis O to the meshing position 95 which is a position in which the lever-side rotating body 82 and the biasing member-side rotating body 91 engages with each other, is varied according to the operation amount of the clutch lever 60. According to the configuration, since the ratio $d\theta2/d\theta1$ can be varied as the ratio D2/D1 is varied, the clutch lever apparatus 50 showing the above-mentioned effects can be provided.

In addition, the ratio $d\theta2/d\theta1$ is decreased as the operation amount of the clutch lever 60 is increased. In the configuration, a percentage of a torque transmitted from the biasing member 97 to the clutch lever 60 via the biasing member-side rotating body 91 and the lever-side rotating body 82 is decreased as the operation amount of the clutch lever 60 is increased. Accordingly, a rate of increase of the operation reaction force of the clutch lever 60 is reduced as the operation amount of the clutch lever 60 is increased. Accordingly, the operation reaction force of the clutch lever 60 is increased to gradually approach a predetermined value as the operation amount of the clutch lever 60 is increased. Accordingly, like operation feeling of the clutch lever used in the manual transmission in the related art, the operation reaction force of the clutch lever 60 can approach a property that is substantially uniform in a final stage of the operation.

In addition, the biasing member-side rotating body 91 is disposed at a side opposite to a side at which the clutch lever 60 extends with respect to the pivot center (the first axis O) of the clutch lever 60. Accordingly, an increase in size of the clutch lever apparatus 50 in the direction in which the clutch lever 60 extends (the vehicle width direction) can be minimized.

In addition, the biasing member 97 is a torsion coil spring wound around the rotation center (the second axis P) of the biasing member-side rotating body 91. For this reason, since the biasing member 97 is disposed coaxially with the biasing member-side rotating body 91, the clutch lever apparatus 50 can be decreased in size in comparison with the configuration in which the biasing member is installed next to the biasing member-side rotating body 91. In addition, since the biasing member 97 is disposed coaxially with the biasing member-side rotating body 91, the biasing member-side rotating body 91 can be easily biased around the second axis P. Accordingly, a complication of the structure of the clutch lever apparatus 50 can be prevented.

In addition, the clutch lever 60 is installed to be independently pivotable with respect to the lever-side rotating body 82 by a predetermined angle from the position before operation of the clutch lever 60, and the clutch lever apparatus 50 further includes the auxiliary biasing member 98 configured to bias the clutch lever 60 toward the position before operation of the clutch lever 60 with respect to the lever-side rotating body 82. According to the configuration, the clutch lever 60 can be pivoted while contracting the auxiliary biasing member 98 from the position before operation of the clutch lever 60 to the predetermined angle without pivoting the lever-side rotating body 82. Accordingly, a lever play can be set in a pivot range from a grip beginning of the clutch lever 60 to the predetermined angle. Accordingly, the same operation feeling as the operation feeling of the clutch lever used in the manual transmission of the related art can be reproduced.

In addition, the lever-side rotating body 82 includes the lever-side gear section 84, and the biasing member-side rotating body 91 includes the biasing member-side gear section 93 that meshes with the lever-side gear section 84. For this reason, the biasing member-side rotating body 91 can be engaged with the lever-side rotating body 82, and the linkage mechanism 81 configured to link the clutch lever 60 and the biasing member 97 can be formed.

In addition, the rotation sensor 100 is disposed coaxially with the rotation center of the clutch lever 60.

According to the configuration, the rotation sensor 100 can directly detect the rotation angle of the clutch lever 60. Accordingly, a rotation angle of the clutch lever 60 can be accurately detected without receiving an influence of a backlash in the meshing position 95 which is a position in which the lever-side rotating body 82 and the biasing member-side rotating body 91 meshes with each other. In addition, like the embodiment, even when the lever play is formed in a pivot range of the clutch lever 60, a rotation angle of the clutch lever 60 can be accurately detected by directly detecting the rotation angle of the clutch lever 60.

In addition, the rotation sensor 100 is disposed under the base section 61 of the clutch lever 60.

For this reason, it can be avoided that the rotation sensor is disposed to protrude upward from the clutch lever 60 and becomes an obstacle with respect to the operator.

(Second embodiment)

Figure 8:
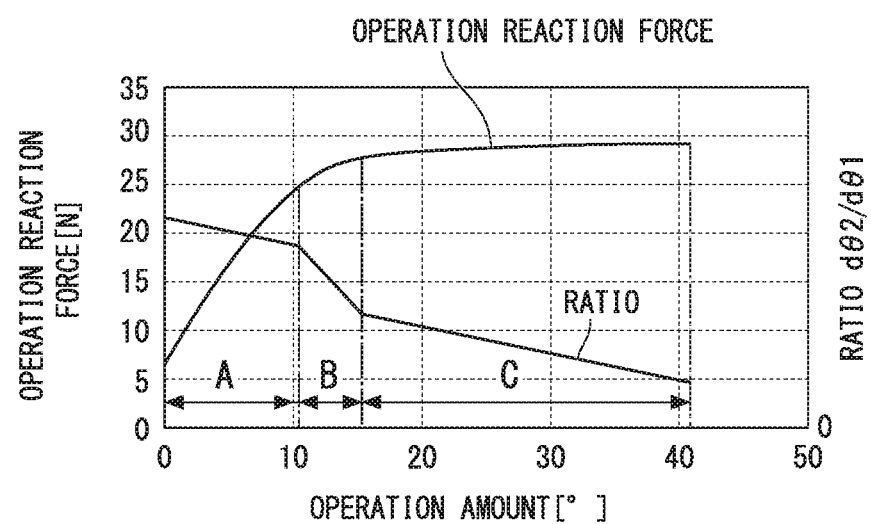
FIG. 8 is a graph schematically showing variation of an operation reaction force with respect to an operation amount of a clutch lever in a clutch lever apparatus of a second embodiment.

FIG. 8 is a graph schematically showing variation of an operation reaction force with respect to an operation amount of a clutch lever and a variation of the ratio $d\theta2/d\theta1$ in a clutch lever apparatus of a second embodiment.

In FIG. 8, a lateral axis represents an operation amount of the clutch lever, a vertical axis on a left side represents an operation reaction force applied to the clutch lever, and a vertical axis on a right side represents a ratio $d\theta2/d\theta1$. Further, in FIG. 8, a lever play in an operation starting stage of the clutch lever 60 is ignored.

As shown in FIG. 8, in the second embodiment, a rate change (a derivative value) of the ratio $d\theta2/d\theta1$ is distinguished from the first embodiment shown in FIG. 7 in that an intermediate region B of an operation range of the clutch lever 60 is smaller than another region.

Hereinafter, features of the second embodiment different from the first embodiment will be described in detail.

As shown in FIG. 8, the ratio $d\theta2/d\theta1$ is continuously and gradually reduced as the operation amount of the clutch lever 60 is increased. Accordingly, a rate of increase of an operation reaction force with respect to the operation amount of the clutch lever 60 is continuously and smoothly reduced as the operation amount of the clutch lever 60 is increased. As a result, the operation reaction force of the clutch lever 60 is non-linearly and continuously varied with respect to the operation amount of the clutch lever 60.

Further, in the operation range of the clutch lever 60, the intermediate region B is a region in which a rate change of the ratio d$\theta$2/d$\theta$1 is smaller than that of an operation early region A, which has a smaller operation amount of the clutch lever 60 compared to the intermediate region B, and that of an operation later region C, which has a larger operation amount of the clutch lever 60 compared to the intermediate region B. That is, in the intermediate region B within the operation range of the clutch lever 60, a rate change of the ratio d$\theta$2/d$\theta$1 is smaller than in regions on both sides that sandwiches the intermediate region B therebetween. For this reason, in the intermediate region B within the operation range of the clutch lever 60, a rate of increase of the operation reaction force of the clutch lever 60 is decreased more greatly than in the operation early region A and the operation later region C. Accordingly, a rate of increase of the operation reaction force with respect to the operation amount of the clutch lever 60 is clearly reduced in the operation later region C with respect to the operation early region A. Further, since a rate change of the ratio d$\theta$2/d$\theta$1 is negative throughout the operation range of the clutch lever 60, a rate change of the ratio d$\theta$2/d$\theta$1 being small is synonymous with an absolute value of an inclination of the ratio d$\theta$2/d$\theta$1 being large. In addition, in the embodiment, while the ratio d$\theta$2/d$\theta$1 is not differentiable in both end portions of the intermediate region B in the operation range, the ratio d$\theta$2/d$\theta$1 may be differentiable.

The configuration can be realized by forming the lever-side gear section 84 and the biasing member-side gear section 93 such that a ratio D1/D2 of the first distance D1 with respect to the second distance D2 is varied similarly to the ratio d$\theta$2/d$\theta$1. That is, the lever-side gear section 84 is formed such that a distance from the first axis O to the teeth 84a is largely varied in an intermediate section of an outer circumference of the lever-side gear section 84 more than both sides thereof. It is also the same as in the biasing member-side gear section 93.

In this way, in the embodiment, a rate change of the ratio d$\theta$2/d$\theta$1 is smaller in the intermediate region B within the operation range of the clutch lever 60 than regions of both sides with the intermediate region B sandwiched therebetween. According to the configuration, a rate of increase of the operation reaction force with respect to the operation amount of the clutch lever 60 is clearly reduced in the operation later region C with respect to the operation early region A. Accordingly, a property of the operation reaction force of the clutch lever 60 can be brought closer to the operation feeling of the clutch lever used in the manual transmission of the related art.

Further, the present invention is not limited to the above-mentioned embodiment described with reference to the accompanying drawings, various variants are considered without departing from the technical scope of the present invention.

For example, in the embodiment, while the lever-side rotating body 82 and the biasing member-side rotating body 91 have the gear sections meshing with each other, there is no limitation thereto. The lever-side rotating body and the biasing member-side rotating body may be rotating bodies engaged with each other by friction of outer circumferential surfaces thereof.

In addition, another rotating body may be interposed between the clutch lever and the lever-side rotating body or between the biasing member-side rotating body and the biasing member.

In addition, in the embodiment, while the clutch lever apparatus 50 is exemplarily described, a brake lever apparatus may be applied to the present invention. In this case, for example, the brake lever apparatus may be configured such that a rate of increase of an operation reaction force of a lever is increased as an operation amount of the lever is increased.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lever apparatus comprising:
a lever operated by a user;
a biasing member that is a source of an operation reaction force of the lever; and
a linkage mechanism configured to link the lever and the biasing member,
wherein the linkage mechanism includes:
a lever-side rotating body that is configured to pivot according to a pivot of the lever; and
a biasing member-side rotating body that is engaged with the lever-side rotating body and that is installed closer to the biasing member than the lever-side rotating body, and
the linkage mechanism varies a ratio of a variation of a rotation angle of the biasing member-side rotating body with respect to a variation of a rotation angle of the lever-side rotating body according to an operation amount of the lever.

2. The lever apparatus according to claim 1,
wherein the lever-side rotating body is pivoted around a first axis,
the biasing member-side rotating body is pivoted around a second axis which is different from the first axis, and
a ratio of a second distance with respect to a first distance varies according to the operation amount of the lever, the first distance being a distance from the first axis to an engagement position which is a position in which the lever-side rotating body and the biasing member-side rotating body engages with each other, the second distance being a distance from the second axis to the engagement position.

3. The lever apparatus according to claim 2,
wherein the ratio of the variation of the rotation angle of the biasing member-side rotating body with respect to the variation of the rotation angle of the lever-side rotating body is reduced as the operation amount of the lever is increased.

4. The lever apparatus according to claim 3,
wherein a rate change of the ratio of the variation of the rotation angle of the biasing member-side rotating body with respect to the variation of the rotation angle of the lever-side rotating body in an intermediate region of an operation range of the lever is smaller than a rate change in regions on both sides of the intermediate region which sandwich the intermediate region.

5. The lever apparatus according to claim 1,
wherein the ratio of the variation of a rotation angle of the biasing member-side rotating body with respect to the variation of the rotation angle of the lever-side rotating body is reduced as the operation amount of the lever is increased.

6. The lever apparatus according to claim 5,
wherein a rate change of the ratio of the variation of the rotation angle of the biasing member-side rotating body with respect to the variation of the rotation angle of the lever-side rotating body in an intermediate region of an operation range of the lever is smaller than a rate change in regions on both sides of the intermediate region which sandwich the intermediate region.

7. The lever apparatus according to claim 1, wherein the biasing member-side rotating body is disposed at a side opposite to a side at which the lever extends toward a pivot center of the lever.

8. The lever apparatus according to claim 1, wherein the biasing member is a torsion coil spring wound around a rotation center of the biasing member-side rotating body.

9. The lever apparatus according to claim 1, wherein the lever is independently pivotably installed with respect to the lever-side rotating body by a predetermined angle from a position before operation of the lever, and an auxiliary biasing member configured to bias the lever toward the position before operation of the lever with respect to the lever-side rotating body is further provided.

10. The lever apparatus according to claim 1, wherein the lever-side rotating body comprises a lever-side gear section, and the biasing member-side rotating body comprises a biasing member-side gear section that meshes with the lever-side gear section.

11. The lever apparatus according to claim 1, further comprising a rotation sensor configured to detect a rotation angle of the lever, wherein the rotation sensor is disposed coaxially with a pivot center of the lever.

12. The lever apparatus according to claim 11, wherein the rotation sensor is disposed below the lever.

* * * * *